(12) United States Patent
Liu

(10) Patent No.: US 6,955,581 B1
(45) Date of Patent: Oct. 18, 2005

(54) LIGHT-DECORATIVE PUPPET LUMINOUS FLUX DRIVING DEVICE

(75) Inventor: Fong-Ku Liu, Taipei (TW)

(73) Assignee: Min Hsien Wang, Taipei ( * ) Notice: Subject to any disclaimer, the term of this patent is extended or adjusted under 35 U.S.C. 154(b) by 0 days.

(21) Appl. No.: 10/915,484

(22) Filed: Aug. 11, 2004

(51) Int. Cl.$^7$ ............................................ A63H 33/22
(52) U.S. Cl. ...................... 446/219; 446/236; 446/242; 446/353; 40/411; 40/547; 362/124; 362/565
(58) Field of Search ................................ 446/327–329, 446/175, 365, 369, 353, 330, 219, 236; 362/124, 362/565, 808; 40/411, 414, 547

(56) References Cited

U.S. PATENT DOCUMENTS

| | | | | |
|---|---|---|---|---|
| 3,699,703 | A | * | 10/1972 | Biecker ........................ 446/83 |
| 4,097,917 | A | * | 6/1978 | McCaslin .................... 362/565 |
| 4,687,457 | A | * | 8/1987 | Milner ........................ 446/175 |
| 6,039,625 | A | * | 3/2000 | Wang .......................... 446/83 |
| 6,394,874 | B1 | * | 5/2002 | Kubo et al. ................. 446/327 |
| 6,692,331 | B1 | * | 2/2004 | Lin ............................. 446/353 |
| 2001/0027077 | A1 | * | 10/2001 | Cartledge et al. ........... 446/268 |

FOREIGN PATENT DOCUMENTS

EP            444528 A1  *  9/1991   ............ A63H 3/20

* cited by examiner

Primary Examiner—Bena Miller
(74) Attorney, Agent, or Firm—Troxell Law Office, PLLC

(57) ABSTRACT

A light-decorative object puppet luminous flux driving device, and more particularly, a driving device for providing an appearance of a light decorative object with dynamic luminous flux effects, includes a base having joined with a puppet located above, and a driving device and a light source at an interior thereof. The driving device is for simultaneously driving a planar grating and a barrel-shaped grating. Using the barrel-shaped grating, contrast light waves are projected onto a body of the puppet and transmitted to an exterior. Using the planar grating, constantly changing glittering effects are formed at illuminating portions of the decorative object for enhancing aesthetic values.

7 Claims, 4 Drawing Sheets

LIGHT-DECORATIVE PUPPET LUMINOUS FLUX DRIVING DEVICE

BACKGROUND OF THE INVENTION (a) Field of the Invention

The invention relates to a light-decorative puppet luminous flux driving device, and more particularly, to a driving device for providing an overall light decorative object with constantly changing saturation effects. The light-decorative puppet luminous flux driving device comprises a driving device for simultaneously driving a planar grating and a barrel-shaped grating that both act upon the decorative object, thereby offering the decorative object with constantly changing saturation effects and dynamic aesthetic values.

(b) Description of the Prior Art

A common decorative object such as puppets, in order to provide illumination and glittering decorative effects, has illuminating bodies at eye portions thereof or at a body portion thereof.

Some other decorative objects are devised with optical fibers, which have output ends thereof distributed at desired positions to be illuminated. However, this type of illumination merely offers glowing effects at ends of optical fibers instead of providing a puppet itself with shining effects. Thus, a head portion of the puppet is given a bright mage whereas a body portion thereof appears rather dull and awkward. Supposed the entire puppet is provided with illumination effects, it is necessary that the entire structure be arranged with optical fibers. A structure of the puppet may become quite complicated to substantially increase production costs while reducing vividness of the puppet.

Therefore, to provide aesthetic values of dynamic luminous flux, the invention utilizes an electronic control device to form dynamic radiant and glittering illumination effects.

SUMMARY OF THE INVENTION

The primary object of the invention is to provide a light-decorative object puppet luminous flux driving device having a simple structure and can be extensively applied to overall appearances of decorative puppets. The light-decorative object puppet luminous flux driving device according to the invention comprises a single driving device for simultaneously driving a planar grating and a barrel-shaped grating. Using the two gratings, the decorative puppet or decorative object is offered with overall illumination and constantly changing saturation effects to further increase aesthetical values of the puppet using dynamic flux.

The secondary object of the invention is to provide a light-decorative object puppet luminous flux driving device having an optical fiber bundle gathered from optical fiber threads at pre-determined illuminating portions of the puppet, wherein the free ends of the optical fiber bundle are distributed according to shapes of the illuminating portions.

Another object of the invention is to provide a light-decorative object puppet luminous flux driving device having a backlight device at an interior of the barrel-shaped grating thereof. Using a light cable branched from the optical fiber bundle, illumination is obtained while a light source is formed for constantly changing saturation effects.

Another object of the invention is to provide a light-decorative object puppet luminous flux driving device having a backlight device implemented using a light emitting diode (LED).

Another object of the invention is to provide a light-decorative object puppet luminous flux driving device having hair thereof constructed using the optical fiber threads mixed with fiber threads, thereby simulating hair lines and subtly assisting illumination effects.

The other object of the invention is to provide a light-decorative object puppet luminous flux driving device having the barrel-shaped grating thereof devised with patterns, thereby projecting dynamic images of the patterns using backlight projection.

DETAILED DESCRIPTION OF THE PREFERRED EMBODIMENTS

To better understand the invention, detailed descriptions of an embodiment shall be given with the accompanying drawings below.

Figure 1:
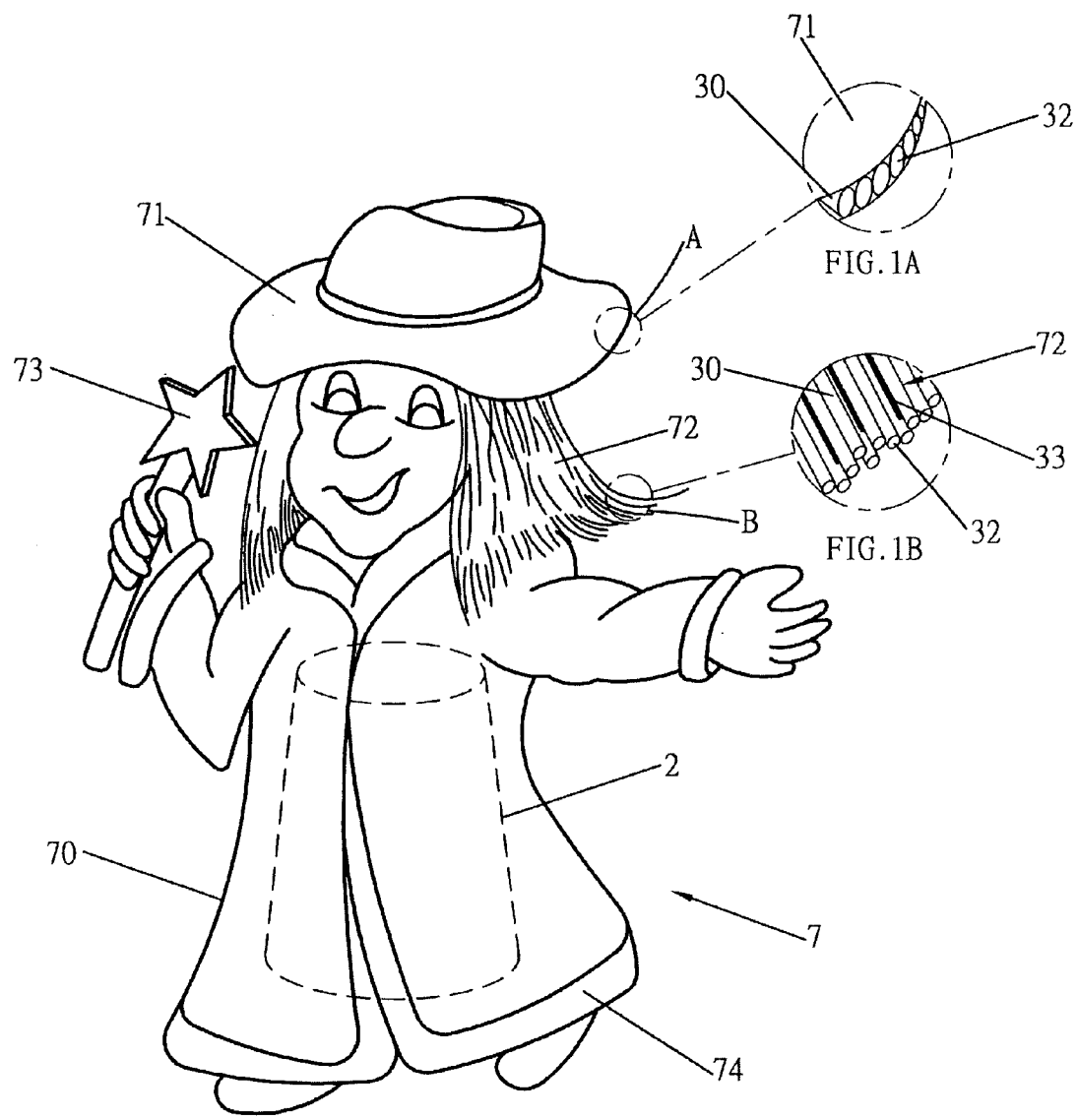
FIG. 1 shows a perspective view according to the invention.

Referring to FIG. 1, a light decorative puppet luminous flux driving device according to the invention is targeted for exhibiting dynamic contrast light decorative effects at a body portion of a light decorative puppet, and simulates shapes of illuminating sections such as hair or a hat breadth using optical fiber threads in conjunction with large-area illumination at the body portion of the puppet, thereby offering the puppet with overall aesthetic values from dynamic luminous flux.

The driving device acts upon a barrel-shaped grating 2 in a body portion of a puppet 7. The puppet 7 has an outer cover 70 thereof being pervious to light; a hat breadth 71, hair 72, a start decorative object 73, and even a lower hem 74 thereof distributed with optical fiber threads 30, so as to emulate shapes of the aforesaid parts for accomplishing illumination simulation.

The hat breadth 71 has a periphery thereof distributed with the optical fiber threads 30, which has output ends 32 thereof located near or leveled with the periphery of the hat breadth 71. Through the output ends 32, spotted rays are emitted, and line-shaped illumination effects are formed at the periphery of the hat breadth 71 when a plurality of output ends 32 is gathered. Similarly, the hair 72 can be constructed using the optical fiber threads 30 as well.

Each of the output ends 32 is for emitting a stream light. To form hallow light effects at axial outer peripheries of the optical fiber threads 30 using optical attenuation, plastic optical fibers having large optical attenuation constants are adopted. Thus, each thread of hair 72 is illuminated to provide an overall radiating appearance.

To shape the hair 72 with a particular style, the optical fiber threads 30 are bent in advance by any desired thermal means using a hair dryer for instance. The processing method is operated without damaging outer reflecting layers of the optical fiber threads 30 as a primary criterion.

To shield emitted luminous flux at the output ends 32 of the optical fiber threads 30, the output ends 32 of the optical fiber threads 30 at the hair 72 are performed with a light-shielding procedure. To complete the light-shielding procedure, a light-shielding material is applied to the output ends 32. The light-shielding material can be as simple as paint having light-shielding effects. Paint is preferably used for that it has molecules which are similar to plastic material molecules of plastic optical fiber suggested by the invention and can be easily joined with the plastic optical fibers.

The hair 72 is constructed using the optical fiber threads 30, and can be mixed with fiber threads 33 such as cotton threads or fiber threads made of plastic polymer having other light-shielding effects. Using isolation developed by the light-shielding threads, the hair 72 can be arranged with a desired style because the fiber threads 33 are not light transmissive while also having light-shielding effects. When observing the hair 72 having mixed illuminated optical fiber threads 30 and the light-shielding fiber threads 33, hair line distribution of the puppet can be more easily noticed.

Figure 2:
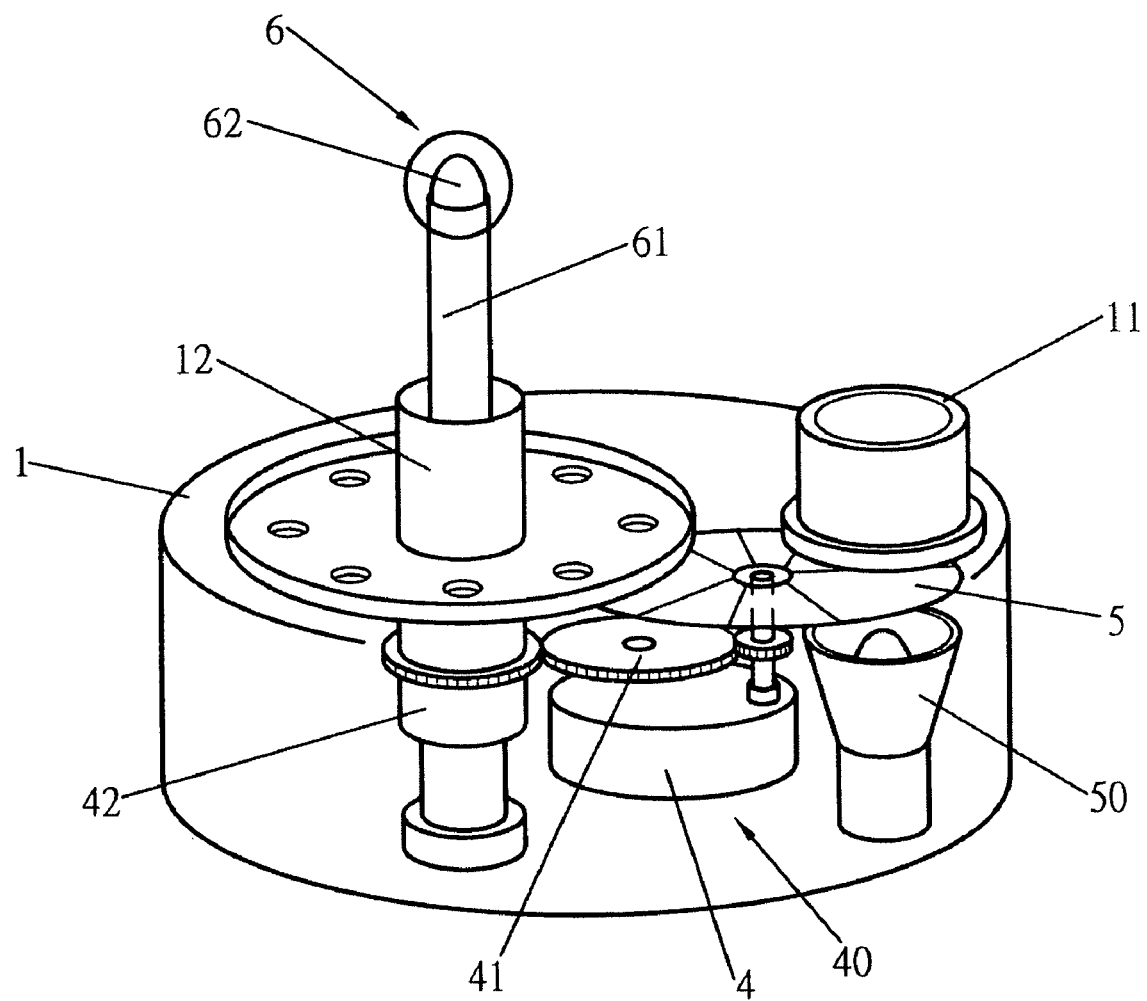
FIG. 2 shows a schematic view illustrating an interlocking structure of the driving device according to the invention.

The barrel-shaped grating 2 and a light source of an illumination section thereof are accomplished using a driving device 4 located in a base 1. Referring to FIG. 2, using a transmission assembly 40, a planar grating 5 and a transmission shaft 42 are simultaneously driven. A rotation axis 42 flexibly disposed at the base 1 and a grating 5 are impelled by the driving device 4 through a transmission wheel 41, with the rotation axis 42 further interlocking a transmission axis 12 located above. The planar 5 acts upon a luminous flux coupler 11 having a light source 50 located below. The base 1 also has an illuminating backlight device 6 via a supporting post 61.

Figure 3:
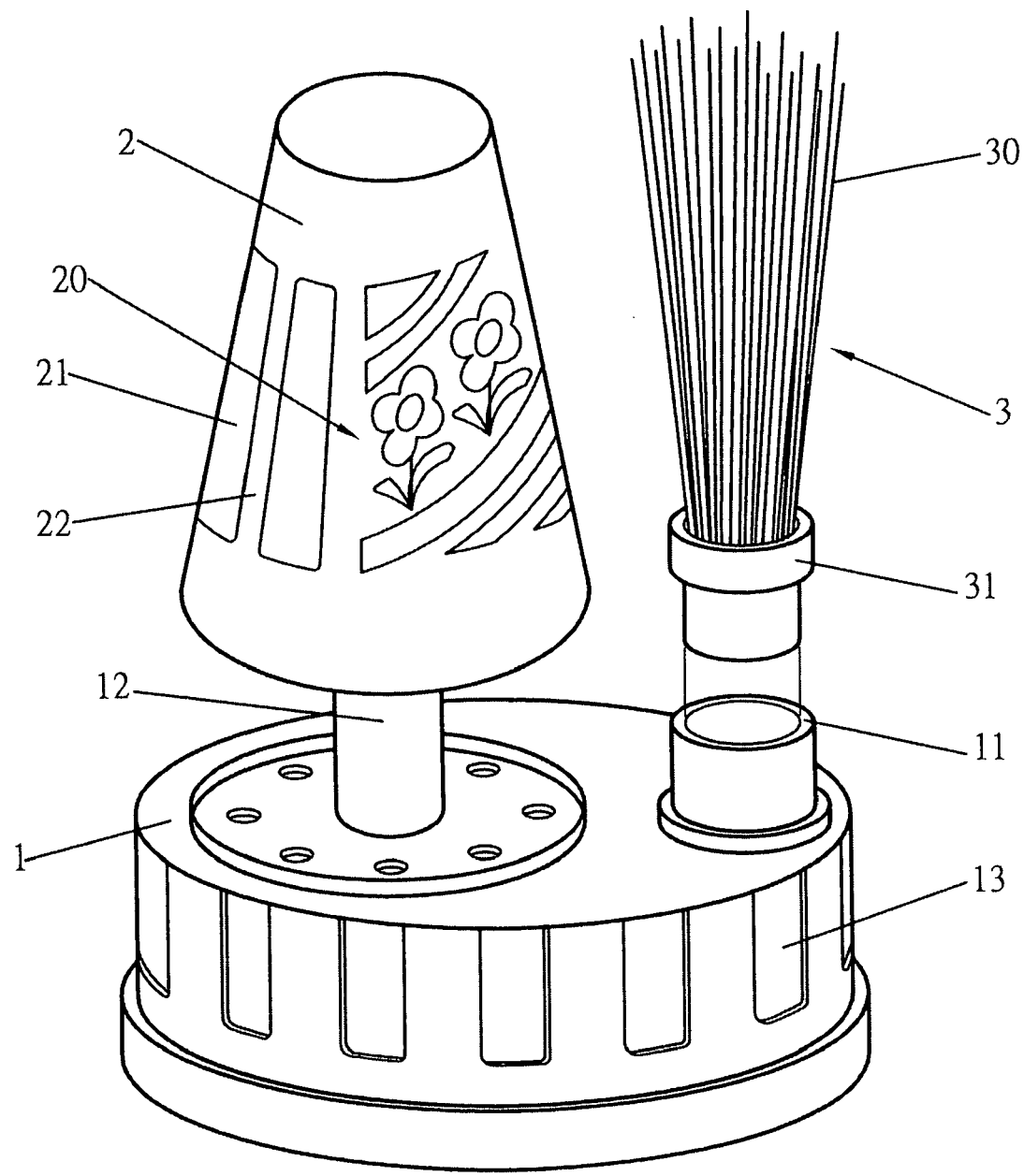
FIG. 3 shows a schematic view the base assembled with the barrel-shaped grating and the optical fiber bundle according to the invention.

Referring to FIG. 3, the flexibly disposed transmission axis 12 above the base 1 is joined with and is for driving the barrel-shaped grating 2.

The barrel-shaped grating 2 has surfaces thereof formed with light-pervious sections 21 and light-shielding sections 22 using patterns. Using impulsion of the transmission axis 12 and backward projection of the backlight device 6, the light-pervious sections 21 are allowed to discharge luminous flux that is projected onto the puppet outer cover 70 shown in FIG. 1, thereby offering the puppet with overall aesthetic values from dynamic luminous flus at a body portion thereof.

Referring to FIG. 3, the light-pervious sections 21 and the light-shielding sections 22 at the barrel-shaped grating 2 can be implemented with patterns having light-shielding effects. The patterns 20 are blossom-shaped and images thereof can be similarly projected onto the puppet outer cover 70 using the backlight device 6.

Luminous flux outputted from the planar grating 5 is gathered at the coupler 11. The coupler 11 is for providing input ends of an optical fiber bundle 3 with coupling connection 31, wherein the optical fiber bundle 3 is formed by a plurality of gathered optical fiber threads 30.

The base 1 is devised with heat dissipating openings 13 for ventilation and exchanging high temperatures at an interior thereof. Free ends of the optical fiber bundle 3 are distributed as illuminating portions of the puppet decorative object as the hat breath 71, the hair 72, the decorative object 73 and the lower than hem 74 shown in FIG. 1, or any other illuminating portions to be simulated.

Figure 4:
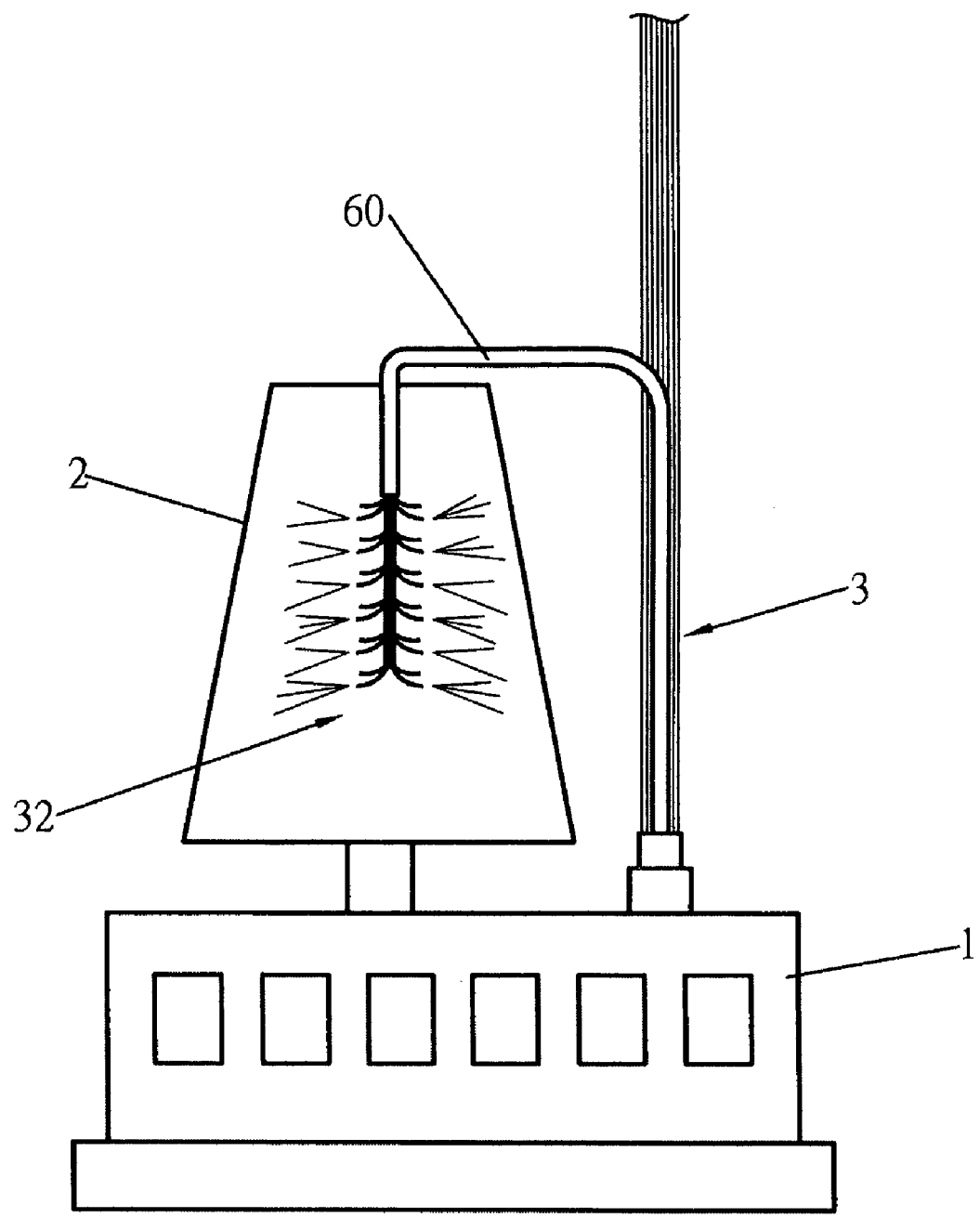
FIG. 4 shows a schematic view illustrating the barrel-shaped grating having another backlight implementation according to the invention.

For that the optical fiber bundle 3 is formed by a plurality of optical fiber threads 30, and can thus be implemented in branches. Referring to FIG. 4, the optical fiber bundle 3 is branched with a light cable 60. The light cable 60 has an input end thereof guided into an interior of the grating 2 to serve as the backlight device 6, and an output end thereof guided to a surface of the grating 2 to eliminate the backlight device 6. Using various saturations of light waves from the grating 6, surfaces of the barrel-shaped grating 2 are offered with numerous projection effects of different light wave lengths, such that the outer cover 70 of the puppet are also projected with distinct colors to form constantly changing luster.

Referring to FIG. 2, the backlight device 6 can be implemented by lighting devices in any desired form. To avoid heat effects, a light emitting diode (LED) element 62 may be adopted for achieving backlight effects. It is to be noted that the LED element 62 has a single projection direction, and hence a projection angle thereof has to be maintained in order to project onto surfaces of the barrel-shaped grating 2 to be exhibited. The transmission assembly 40 is formed by a driving device 4 that impels the planar grating 5 and the rotation axis 42. Apart from the transmission means using the transmission wheel 41, the interlocking structure can also be performed by other mechanisms having interlocking effects. For example, interlocking using a belt, or an intermittent driving device such as a Danish mechanism can be installed between the driving device 4 and the rotation axis 42. Using the intermittence provided, the barrel-shaped grating 2 is capable of intermittently rotate to give more apparent alternating dynamic effects.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A decorative light comprising:
   a) a base;
   b) a puppet body made of a material that is pervious to light and having:
      i) illuminating portions; and
      ii) a hollow interior;
   c) a barrel shaped grating located in the hollow interior of the puppet body;
   d) a planar grating located in the base;
   e) a transmission assembly rotating the planar grating and the barrel shaped grating;
   f) a driving device located in an interior of the base and driving the transmission assembly;
   g) a plurality of fiber optical threads having an end connected to a luminous flux coupler of the base;
   h) a light source located in the interior of the base and projecting a light through the planar grating and each of the plurality of fiber optical threads, a flux of the planar grating is transmitted to the illuminating portions of the puppet body; and
   i) a back light device illuminating the barrel shaped grating and the puppet body.

2. The decorative light according to claim 1, wherein the illuminating portions of the puppet body include a predetermined number of the plurality of body optical fiber threads distributed thereon.

3. The decorative light according to claim 1, wherein the puppet body includes a plurality of light-shielding fiber threads.

4. The decorative light according to claim 1, wherein a predetermined number of the plurality of optical fiber threads have a portion coated with a light-shielding material.

5. The decorative light according to claim 1, wherein the back light device having an light emitting diode.

6. The decorative light according to claim 1, wherein the back light device having a light cable including a predetermined number of fiber optical threads of the plurality of fiber optical threads.

7. The decorative light according to claim 1, wherein the barrel shaped grating includes a plurality of patterns having light-pervious sections and light-shielding sections, the plurality of patterns being projected onto an outer puppet cover of the puppet body.

* * * * *